2,863,923

PROCESS FOR THE PREPARATION OF 2,5-DIMETHYLCYCLOPENTANONE

Newman M. Bortnick, Oreland, Pa., assignor to Rohm & Haas Company, Philadelphia, Pa., a corporation of Delaware No Drawing. Application October 20, 1955
Serial No. 541,852

6 Claims. (Cl. 260—586)

This invention relates to a process for the preparation of 2,5-dimethylcyclopentanone.

The present invention is concerned with the cyclization of a dialkyl $\alpha,\alpha'$-dimethyladipate in the vapor phase at elevated temperatures in the presence of a specific metal oxide as a catalyst, to form 2,5-dimethylcyclopentanone, to be more fully explained hereinafter. The alkyl portions of the present compounds are methyl, ethyl, propyl, isopropyl, butyl, isobutyl, and tert-butyl, preferably methyl. Within the same molecule it is possible to have different alkyl groups, but it is preferable to have both alkyl groups the same.

The dialkyl 2,5-dimethyladipate reactants are well known or may be prepared by known methods. For instance, the dimethyl ester may be prepared by heating methyl methacrylate for twelve hours at about 225° C. under conditions of autogenous pressure and in the presence of about 1% hydroquinone as an inhibitor. The resultant dimethyl $\alpha$-methylene-$\alpha'$-methyladipate is hydrogenated in the presence of Raney nickel, at a temperature below about 120° C. and at a hydrogen pressure in the range of about 500 to 2000 pounds per square inch, in which the hydrogen reacts with the diester on a mole for mole basis. Other of the reactants may be obtained by reacting 2,5-dimethyladipic acid with the desired alcohol under esterifying conditions. Also, by the transesterification of dimethyl 2,5-dimethyladipate with the appropriate alcohol, the other diester reactants of this invention may be made.

The cyclization of a dialkyl-$\alpha,\alpha'$-dimethyladipate is conducted in the vapor phase in the temperature range of about 350° to 600° C., preferably 400° to 475° C. Atmospheric, subatmospheric, or superatmospheric pressures may be used. It is often advantageous to employ subatmospheric pressures down to as low as about 25 mm. mercury.

The catalysts employed are the oxides of metals, the metal portion of which have atomic weights between about 7 and 137. The most effective catalysts appear to be the oxides of sodium, potassium, lithium, calcium, barium, strontium, cadmium, zinc, manganese, copper, iron, nickel, and cobalt. The oxides of manganese, cadmium, and sodium are preferred. It is desirable to employ a carrier in conjunction with the above listed catalysts. Suitable as carriers are activated alumina, clays, silica, pumice, diatomaceous earth, carbon, and the like, preferably alumina. The purpose of the carrier, of course, is to provide a large surface area of catalyst. Generally, the larger the surface area of catalyst the better the results are with respect to higher yield and shorter time of reaction. The catalysts may be prepared by evaporating a slurry of the carrier, preferably in discrete particles of about 8 to 14 mesh size, and an aqueous solution of the metal nitrate until all of the water is expelled. The nitrate form can then be converted to the oxide form by ignition. The catalyst may be used repeatedly without the need of regeneration. When regeneration is indicated such as accomplished by burning off the carbonaceous deposits in air.

It is preferable to conduct the present reaction by passing, on a substantially continuous basis, the dialkyl-$\alpha,\alpha'$-dimethyladipate through a reaction zone maintained at the temperatures of reaction previously stated. The reaction zone is preferably packed with the catalyst, heretofore described, and supported in place by glass Raschig rings or other conventional means of supporting catalysts. It is frequently advantageous to employ an elongated substantially cylindrical reactor preferably of glass or similar material, surrounded by an iron or steel jacket, packed with the catalyst. The catalyst is positioned within the entire reaction zone and will generally occupy about 40 to 60% of the actual space within the reaction zone depending largely on the size and shape of the catalyst particles and the shape of the reaction zone.

Liquid space velocities in the range of 0.1 to 10 ml. of reactant per ml. of reaction zone per hour are employed, preferably 0.5 to 2.5. It is preferable to operate at such a space velocity and temperature that conversions in the range of about 50 to 70% per pass are obtained in order to minimize the chance of undesirable side reactions. The preferred ranges of space velocities and temperatures previously set forth substantially effect the desired conversions. Yields up to about 95% are consistently obtained.

The product of the present invention is a liquid that is isolated by distillation at the conclusion of the reaction. The present compound is a pleasant smelling liquid that is useful as a perfume base or as a lacquer solvent. It is also useful as a nail polish remover, particularly for the nitrocellulose lacquer polishes. The instant compound is valuable as a gloss improver for urea-formaldehyde and melamine-formaldehyde-alkyd baking enamels.

The method of preparation of the present compound may be more clearly understood from the following illustrative example, in which parts by weight are used throughout.

EXAMPLE

An aqueous solution containing 50 parts of cadmium nitrate tetrahydrate and 100 parts of water is added to 180 parts of 8 to 14 mesh activated alumina and heated first until all of the water is expelled and then until the evolution of nitrogen dioxide ceases. The catalyst is cooled, freed of fine particles by screening, and placed in a vertical glass tube thirty inches long and twenty-one millimeters in inside diameter. A layer of glass Raschig rings is employed at each end of the tube to maintain the catalyst in the desired position. A thermocouple well and thermocouple are positioned axially within the tube. The glass tube is positioned within an iron furnace and supplied with fittings to accommodate the entry of the reactant and the exit of the product. There is, also, provided attachments to permit the reaction zone to be swept with nitrogen. The product is collected in an ice-cooled receiver. The reactant is preferably added either from a dropping funnel or by means of a bellows pump.

Through the glass tube described above there is passed over a period of 29 minutes 100 parts of dimethyl 2,5-dimethyladipate. The catalyst used is manganese dioxide on alumina and the space velocity is 2.72 ml. of reactant/ml. of catalyst/hour. The reaction temperature is maintained at 435° to 465° C. After the reactant is added the system is swept with nitrogen. The liquid collected in the receiver is distilled and the product cut distills at 147° to 149° C. The product gives an $n_D^{25}$ value of 1.4279. The 2,4-dinitrophenylhydrazone derivative melts at 167.5° to 168° C. The product is identified as 2,5-dimethylcyclopentanone. The same product is obtained by using the corresponding ethyl, propyl, and butyl diesters as the reactant. Other typical conditions that are employed with satisfactory results are listed in the following table, in which the reactant is dimethyl 2,5-dimethyladipate.

Table

| Catalyst | Temperature Range, ° C. | Space Velocity, ml. of reactant/ ml. catalyst/ hour |
|---|---|---|
| CdO on Al₂O₃ | 375–405 | 0.64 |
| Na₂O on Al₂O₃ | 450–475 | 1.60 |
| CdO on Al₂O₃ | 395–413 | 1.28 |
| CdO on Al₂O₃ | 430–458 | 0.48 |
| ZnO on Al₂O₃ | 440–475 | 2.08 |
| CdO on Al₂O₃ | 410–460 | 2.32 |
| Na₂O on Al₂O₃ | 460–480 | 1.36 |
| CdO on Al₂O₃ | 415–475 | 1.68 |
| CdO on Al₂O₃ | 493–502 | 0.80 |

The other catalysts, temperatures, and space velocities, set forth previously, as well as those listed in the table above, produce the desired results with the stated reactants of this invention.

The present invention contemplates the vapor phase cyclization of a dialkyl 2,5-dimethyladipate, in the presence of a metallic oxide catalyst and in a restricted temperature range, to form 2,5-dimethylcyclopentanone. This invention is characterized by rapidity of reaction with short contact times between the reactant and the catalyst. The product, in high yields, is readily isolated without the necessity of separation from the catalyst and the catalyst may be used repeatedly without regeneration.

I claim:

1. A continuous catalytic method for the vapor phase preparation of 2,5-dimethylcyclopentanone which comprises heating in a reaction zone a dialkyl 2,5-dimethyladipate, in which each of the alkyl groups has from one to four carbon atoms, in the temperature range of about 350° to 600° C. in the presence of a metallic oxide catalyst, the metal portion of which has an atomic weight of about 7 to 137.

2. A continuous catalytic method for the vapor phase preparation of 2,5-dimethylcyclopentanone which comprises heating in a reaction zone a dialkyl 2,5-dimethyladipate, in which each of the alkyl groups has from one to four carbon atoms, in the temperature range of about 400° to 475° C. in the presence of a metallic oxide catalyst, the metal portion of which has an atomic weight of about 7 to 137, employing space velocities in the range of about 0.1 to 10 ml. of reactant per ml. of reaction zone per hour.

3. A continuous catalytic method for the vapor phase preparation of 2,5-dimethylcyclopentanone which comprises heating in a reaction zone a dialkyl 2,5-dimethyladipate, in which each of the alkyl groups has from one to four carbon atoms, in the temperature range of about 400 to 475° C. in the presence of a metallic oxide catalyst, the metal portion of which is a member from the class consisting of sodium, potassium, lithium, calcium, barium, strontium, cadmium, zinc, manganese, copper, iron, nickel, and cobalt, employing space velocities in the range of about 0.5 to 2.5 ml. of reactant per ml. of reaction zone per hour.

4. A continuous catalytic method for the vapor phase preparation of 2,5-dimethylcyclopentanone which comprises heating in a reacting zone dimethyl 2,5-dimethyladipate, in the temperature range of about 350° to 600° C. in the presence of a metallic oxide catalyst, the metal portion of which has an atomic weight of about 7 to 137, employing space velocities in the range of about 0.1 to 10 ml. of reactant per ml. of reaction zone per hour.

5. A continuous catalytic method for the vapor phase preparation of 2,5-dimethylcyclopentanone which comprises heating in a reaction zone dimethyl 2,5-dimethyladipate, in the temperature range of about 400° to 475° C. in the presence of a metallic oxide catalyst, the metal portion of which is a member from the class consisting of sodium, potassium, lithium, calcium, barium, strontium, cadmium, zinc, manganese, copper, iron, nickel, and cobalt, employing space velocities in the range of about 0.5 to 2.5 ml. of reactant per ml. of reaction zone per hour.

6. A continuous catalytic method for the vapor phase preparation of 2,5-dimethylcyclopentanone which comprises heating in a reaction zone dimethyl 2,5-dimethyladipate in the temperature range of about 400° to 475° C. in the presence of cadmium oxide, employing space velocities of about 0.5 to 2.5 ml. of reactant per ml. of reaction zone per hour.

References Cited in the file of this patent

FOREIGN PATENTS 19,409     Great Britain            June 19, 1913

OTHER REFERENCES

Noyes et al.: J. Am. Chem. Soc., vol. 32, p. 1065 (1910).